United States Patent
Nishiyama et al.

(10) Patent No.: US 10,906,672 B2
(45) Date of Patent: Feb. 2, 2021

(54) AUTONOMOUS OPERATION PLANNING SYSTEM FOR ARTIFICIAL SATELLITE AND OPERATION PLANNING APPARATUS THEREFOR

(71) Applicant: Mitsubishi Electric Corporation, Chiyoda-ku (JP)

(72) Inventors: Takehiro Nishiyama, Tokyo (JP); Kenji Kitamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 131 days.

(21) Appl. No.: 16/311,070

(22) PCT Filed: Jul. 18, 2017

(86) PCT No.: PCT/JP2017/025908
§ 371 (c)(1),
(2) Date: Dec. 18, 2018

(87) PCT Pub. No.: WO2018/016471
PCT Pub. Date: Jan. 25, 2018

(65) Prior Publication Data
US 2020/0024001 A1 Jan. 23, 2020

(30) Foreign Application Priority Data
Jul. 19, 2016 (JP) .................................. 2016-141526

(51) Int. Cl.
*B64G 1/24* (2006.01)
*B64G 3/00* (2006.01)

(52) U.S. Cl.
CPC ............. *B64G 1/244* (2019.05); *B64G 1/242* (2013.01); *B64G 3/00* (2013.01)

(58) Field of Classification Search
CPC .......... B64G 1/244; B64G 1/242; B64G 3/00; B64G 1/24
See application file for complete search history.

(56) References Cited

U.S. PATENT DOCUMENTS

| 5,452,869 A | 9/1995 | Basuthakur et al. |
| 5,506,780 A * | 4/1996 | Montenbruck ...... B64G 1/1085 701/531 |

(Continued)

FOREIGN PATENT DOCUMENTS

JP  2009-179141 A  8/2009

OTHER PUBLICATIONS

Extended European Search Report dated Jun. 6, 2019 in corresponding European Patent Application No. 17830987.8 citing documents AA, AB and AO therein, 8 pages.

(Continued)

*Primary Examiner* — Marthe Y Marc-Coleman
(74) *Attorney, Agent, or Firm* — Xsensus LLP

(57) ABSTRACT

In a satellite side, there are provided a satellite-side operation parameter storage and an operation planning unit; and on a ground side, there are provided a ground-side operation parameter setting unit, a ground-side operation parameter storage to store operation parameters the same as stored in the operation parameter storage of the satellite-side, and an operation plan estimation unit having the same function as that of the operation planning unit of the satellite side. The ground-side operation parameter setting unit determines operation parameters to be used for the operation plan; and when necessary, the ground-side operation parameter setting unit saves them to the ground-side operation parameter storage and uploads them to the satellite-side operation parameter storage. The ground-side operation plan estimation unit and the satellite-side operation planning unit each (Continued)

produce operation plans according to the same operation parameters.

20 Claims, 14 Drawing Sheets

(56) References Cited

U.S. PATENT DOCUMENTS

| | | | |
|---|---|---|---|
| 7,856,294 B2 | 12/2010 | Van Gaasbeck et al. | |
| 2008/0177430 A1 | 7/2008 | Tekawy et al. | |
| 2018/0034536 A1* | 2/2018 | Trutna .............. | H04B 7/18521 |

OTHER PUBLICATIONS

International Search Report dated Oct. 3, 2017 in PCT/JP2017/025908 filed on Jul. 18, 2017.

* cited by examiner

Fig. 2

| Time | Content |
|---|---|
| t1 − T1 | Start driving antenna A1 |
| t1 | Start tracking ground station G1 by antenna A1 |
| t1 + T2 | Turn on communication device C1 |
| t2 − T3 | Turn off communication device C1 |
| t2 | End tracking ground station G1 by antenna A1, and start driving antenna A1 |
| t2 + T4 | End driving antenna A1 |

Fig. 3

| Time | Content |
|---|---|
| t5 – T5 | Start changing satellite attitude |
| t5 | End changing satellite attitude, and turn on observation device |
| t6 | Turn off observation device, and start changing satellite attitude |
| t6 – T6 | End changing satellite attitude |

AUTONOMOUS OPERATION PLANNING SYSTEM FOR ARTIFICIAL SATELLITE AND OPERATION PLANNING APPARATUS THEREFOR

TECHNICAL FIELD

The present invention relates to an operation planning system for operating an artificial satellite on an orbit.

BACKGROUND ART

When operating an artificial satellite orbiting the earth, an operation plan is typically produced on the ground, and then commands based on the operation plan are transmitted during a time period when the artificial satellite can communicate with a ground station or a data relay satellite. On the satellite, its onboard devices etc. are controlled in accordance with the commands, to perform operations such as communication or observation. In recent years, in order to reduce operational loads on the ground it is expected to autonomously plan its operations on its orbit. For example, a system configuration for an autonomous operation has been proposed in the Patent Document 1 below. In such an operation planning system, a computer installed in an artificial satellite has a function (called as "Autonomous Tasking Engine (ATE)" in Patent Document 1) to perform operation planning, and the system is configured so as to autonomously make an operation plan on the orbit and execute the plan.

PRIOR ART DOCUMENTS

Patent Document

Patent Document 1: U.S. Pat. No. 7,856,294B2 (Page 38, Right Column: lines 32 to 40: FIG. 1)

SUMMARY OF THE INVENTION

Problems to be Solved by the Invention

In a case where, in order to reduce operational loads on the ground, such an autonomous operation planning system is used for autonomously planning operations on the orbit, a problem is that it is impossible to predict, in advance on the ground side, an operation plan to be produced on the orbit. Because it is unable to predict in advance, there is another problem that it is difficult to produce a ground station operation plan according to the artificial satellite operation plan. Furthermore, judgment of the necessity for changing the plan with commands, decision of future operation demands, or the like is possible only after downlinking the operation plan produced on the orbit or only after executing operations according to the operation plan. This causes time lags and results in degradation of the operation efficiency.

Means for Solving Problem

An autonomous operation planning system for an artificial satellite according to the present invention includes: an operation parameter setting unit to set at least one operation parameter to be used for operating the artificial satellite; a satellite-side operation parameter storage to store the at least one operation parameter; an operation planning unit to calculate a satellite-side operation plan for the artificial satellite, using at least one satellite-side operation parameter in the satellite-side operation parameter storage; an operation control unit to control an operation of the artificial satellite, using the at least one satellite-side operation parameter and the satellite-side operation plan; a ground-side operation parameter storage to store the same operation parameter information as information on the at least one satellite-side operation parameter; an operation plan estimation unit to estimate the satellite-side operation plan as a ground-side operation plan, using at least one ground-side operation parameter; and an operation control estimation unit to estimate the operation of the artificial satellite controlled by the operation control unit, using the at least one ground-side operation parameter and the ground-side operation plan.

Effects of the Invention

According to the present invention, operation uncertainty can be removed to efficiently operate an artificial satellite.

BRIEF DESCRIPTION OF THE DRAWINGS

FIG. 2 is a table showing an operation plan example according to Embodiment 1 of the present invention.

FIG. 3 is a table showing an operation plan example according to Embodiment 1 of the present invention.

EMBODIMENTS FOR CARRYING OUT THE INVENTION

Embodiment 1

Figure 1:
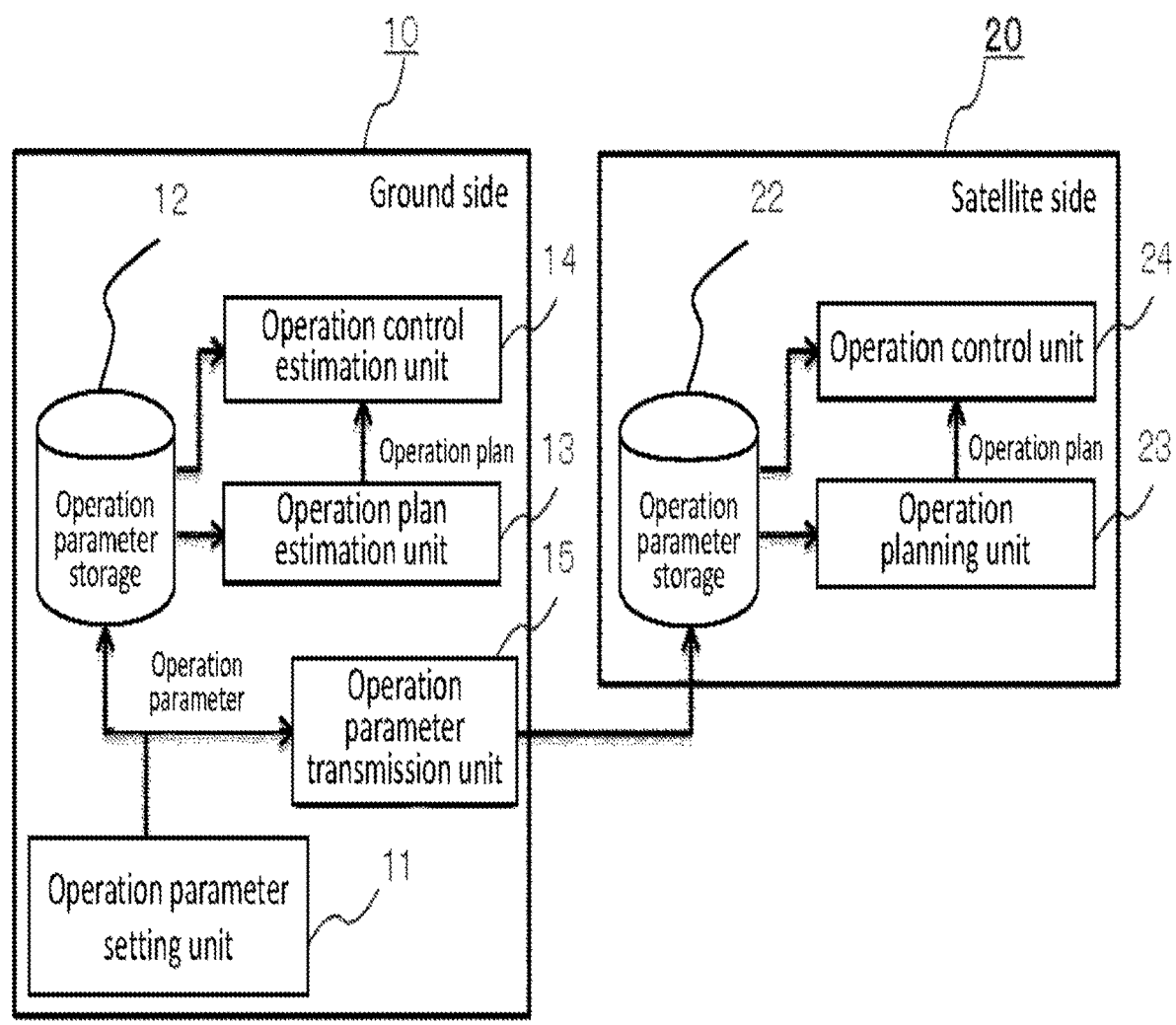
FIG. 1 is a block diagram showing the configuration of an autonomous operation planning system for an artificial satellite according to Embodiment 1 of the present invention.

FIG. 1 is a block diagram showing the configuration of an autonomous operation planning system for an artificial satellite according to Embodiment 1 of the present invention. The autonomous operation planning system shown in FIG. 1, is mainly composed of a ground-side operation planning apparatus 10 installed in a ground facility to operate the artificial satellite, and a satellite-side operation planning apparatus 20 installed in the artificial satellite which is an operation target.

The ground-side operation planning apparatus 10 includes: an operation parameter setting unit 11; a ground-side operation parameter storage 12; an operation plan estimation unit 13; an operation control estimation unit 14; and an operation parameter transmission unit 15. The satellite-side operation planning apparatus 20 includes: a satellite-side operation parameter storage 22; an operation planning unit 23; and an operation control unit 24.

It should be noted that, in the following description, in order to clearly distinguish what relates to the ground side from what relates to the satellite side, the phrases of "ground-side" and "satellite-side" will be frequently used. Also, in order to emphasize that the ground side estimates what the satellite-side is executing, the word "estimate" will be used for the ground side. In figures, the components denoted by the same symbol are the same or equivalent components, which commonly applies to all sentences in this specification and all figures. Further, the configurations of components described in the specification are each an example thereof and not limited to these.

Conventionally, an operation plan is artificially produced and the produced plan is transmitted as commands. Opportunities for transmitting commands from the ground-side to the artificial satellite are limited, causing inconvenience in transmitting the operation plan. Also, even if the artificial satellite-side autonomously produces its operation plan, because the operation plan produced in the artificial satellite side is still unknown to the ground side, it has been difficult to produce, on the basis of the artificial satellite's operation plan, the ground station's operation plan such as a plan for operating an antenna on the ground. In the present embodiment, the system is configured so that the artificial satellite-side will produce an operation plan and the ground side will also produce the same operation plan; therefore, it not only becomes unnecessary to transmit commands from the ground station having constraints but also becomes possible to produce an operation plan of the ground-side facilities etc. on the basis of the operation plan/operation control to be executed in the artificial satellite side.

The operation parameter setting unit 11 uses a conventional technique to calculate and set values of multiple operation parameters used for the operation planning over the future. The operation parameters may include various parameters to be used in the operation plan. For example, the operation parameters may include: model orbit parameters for predicting the satellite's future orbit; parameters indicating the coordinate position and state of the ground station; and parameters about the orbital position of a data relay satellite. In a case when the artificial satellite performs an observation mission, the operation parameters may also include information such as the observation target position. Here, the model orbit parameters are taken as an example for explaining the parameter setting in detail.

When using conventional techniques, the artificial satellite's future orbital position and speed can be calculated and predicted with a certain degree of accuracy on the ground. For example, the predicted orbit can be expressed as osculating orbital elements given at a constant interval such as one minute. The osculating orbital elements are expressed as six parameters of orbit semi-major axis a, eccentricity e, orbital inclination angle i, longitude $\Omega$ of the ascending node, argument $\omega$ of perigee, and perigee passage time $t_0$. By using generally known conversion formulas, the osculating orbital elements and a combination of an orbital position and an orbital velocity can be converted to each other. In calculating the model orbit parameters, the time history of each osculating orbital element is approximated by a time function with a few parameters.

For this time function, various approximation functions can be used, such as a Fourier series expansion and a time polynomial. Furthermore, an element, for example the flatness of the earth's gravity or the gravitation of another astronomical body such as the sun, is known as an element influencing the orbit-changes over time, and the physical model expression for each element is also known. The model orbit parameters each can also be expressed as an approximation function into which such a model is incorporated. In order to obtain the orbital position and the orbital velocity of an artificial satellite at any time point by using the model orbit parameters, the osculating orbital elements are calculated by using the approximation functions, and then, the osculating orbital elements are converted to an orbital position and an orbital velocity, using the conversion formulas.

As described above, the model orbit parameters are for approximately expressing orbit information over the future with a few parameters. Therefore, the parameters can be uploaded anytime from the ground facility to the artificial satellite, using commands of the operation parameter setting unit 11. For example, the operation parameter setting unit 11 utilizes a time period when the artificial satellite and the ground facility can communicate with each other, to transmit the operation parameters in the ground-side operation parameter storage 12, and to simultaneously upload the operation parameters to the satellite-side operation parameter storage 22 via the operation parameter transmission unit 15. This makes it possible that the ground-side operation plan estimation unit 13 and the satellite-side operation planning unit 23 always use the same operation parameter information for producing a ground-side operation plan and a satellite-side operation plan, respectively, which causes the ground-side operation plan to become identical with the satellite-side operation plan. This is because the same operation parameter information means that the types of parameters such as the model orbit parameters and their contents such as specific numerical values of the parameters are identical, and also because the operation plan estimation unit 13 and the operation planning unit 23 are provided with the same function to calculate respective operation plans using the same solution. The solution here means a method for producing an operation plan so as to satisfy constraint conditions given by the operation parameters.

Another example of other operation parameters is ground station information such as the coordinate position of a ground station in an earth-fixed coordinate system and a drive range of a ground station antenna. These parameters can also be uploaded, using the commands, as part of the few parameters anytime to the satellite.

The operation parameters calculated and set by the operation parameter setting unit 11 are uploaded via the operation parameter transmission unit 15, to the artificial satellite, using the time when the artificial satellite and the ground station etc. can communicate with each other. And, the uploaded operation parameters are stored as satellite-side operation parameters in the satellite-side operation parameter storage 22. Simultaneously, the same operation parameters are stored as ground-side operation parameters in the ground-side operation parameter storage 12. In doing so, it is unnecessary to upload all the operation parameter values every time when uploading, but it is necessary to upload only the operation parameter values that vary from those previously uploaded. Then, the operation parameter transmission unit 15 transmits the operation parameters from the ground station to the artificial satellite via radio waves, etc. and the artificial satellite receives the radio waves and stores the received operation parameters, as the satellite-side operation parameters, in the satellite-side operation parameter storage 22.

By the operations described above, the satellite-side operation parameters information stored in the satellite-side operation parameter storage 22 and the ground-side operation parameters information stored in the ground-side operation parameter storage 12 become the same content. This is because the ground-side operation parameter storage 12 and the satellite-side operation parameter storage 22 have the same function. In other words, the satellite-side operation parameter information stored in the satellite-side operation parameter storage 22 and the ground-side operation parameter information stored in the ground-side operation parameter storage 12 are the same kinds of the operation parameters and have the same values about the respective operation parameters.

Each of FIG. 2 and FIG. 3 is a table showing an operation plan example produced by the operation planning unit 23; each of FIG. 2 and FIG. 3 is a simplified table to represent the information example included in an operation plan. The operation planning unit 23 produces a future operation plan using conventional techniques. In doing so, the operation planning unit 23 uses the operation parameters stored in the satellite-side operation parameter storage 22.

FIG. 2 shows an operation plan example to be used for the artificial satellite to become ready for receiving commands from the ground station when the artificial satellite passes over the ground station. In this example, before the artificial satellite reaches an area where it can communicate with the ground station, it is necessary to drive an antenna installed in the artificial satellite and turn the antenna so as to be able to track the ground station. Also, when passing over the ground station, the artificial satellite makes the antenna track the ground station and keeps turning on the power supply for communication devices to set the communication devices to be ready for communication. After the artificial satellite passes through the area where it can communicate with the ground station, the artificial satellite turns off the communication devices and drives the antenna to the original state.

The operation planning unit 23 plans an operational sequence as shown in FIG. 2. In doing so, in order to obtain a time t1 and a time t2 indicated in FIG. 2, it is necessary to calculate timings when the artificial satellite comes to orbital positions at which the antenna installed in the artificial satellite can track the ground station. In doing so, the present embodiment uses the model orbit parameters, the coordinate positions of the ground station, and the like which are included in the operation parameters stored in the satellite-side operation parameter storage 22. With respect to periods T1 and T4 for driving the antenna, it is necessary to set these periods as those possible for practically driving in consideration to the performance of the driving motor etc. of the antenna. Also, in doing so, the periods T1 and T4 can be properly set by using parameters included in the operation parameters such as antenna driving velocity. Instead, each of the antenna driving periods T1 and T4, may be given a fixed period which is, whatever driving angle might be requested, long enough for driving the antenna. In that case, the operation parameter setting unit 11 makes the satellite-side operation parameter storage 22 store a fixed value for the driving periods as an operation parameter.

In FIG. 2, at a time of (t1−T1), an antenna A1 begins to be driven; at the time t1, the antenna A1 starts to track a ground station G1; at a time of (t1+T2), a communication device C1 is turned on; at the time (t2−T3), the communication device C1 is turned off at the time t2, the antenna A1 ends to track the ground station G1 and starts to be driven; and at a time of (t2+T4), the antenna A1 ends to be driven.

FIG. 3 shows an example of an operation plan with which an observation satellite turns the artificial satellite-installed observation sensor toward an observation target to perform observation. Methods for turning the observation sensor to an observation target include: a method for driving only the sensor part; a method for driving a mirror etc. in addition to the sensor part; and a method for changing the entire artificial satellite attitude because the observation sensor is fixed to the artificial satellite. Here, explanation will be made using the method for changing the entire artificial satellite attitude.

In the method of changing the entire artificial satellite attitude, an attitude control actuator such as a reaction wheel installed in the artificial satellite is driven to perform an attitude maneuver which turns the attitude to the observation target. Periods necessary for the attitude maneuvers (periods T5 and T6 shown in FIG. 3) depend on the satellite orbit, the coordinate positions of the observation target, the upper limit value of the actuator torque and so on. Therefore, the operation planning unit 23 uses the satellite-side operation parameters stored in the satellite-side operation parameter storage 22 to calculate these maneuver periods. Also, times t5 and t6 when the observation target can be observed depends on the satellite orbit and the coordinate positions of the observation target, and these times can also be calculated by the operation planning unit 23 using the operation parameters.

In FIG. 3, at a time of (t5−T5), the satellite starts changing the attitude; at the time t5, the satellite ends changing the attitude and then an observation device is turned on; at the time t6, the observation device is turned off, and then the satellite starts changing the attitude; and at a time of (t6+T6), the satellite ends changing the attitude.

Figure 4:
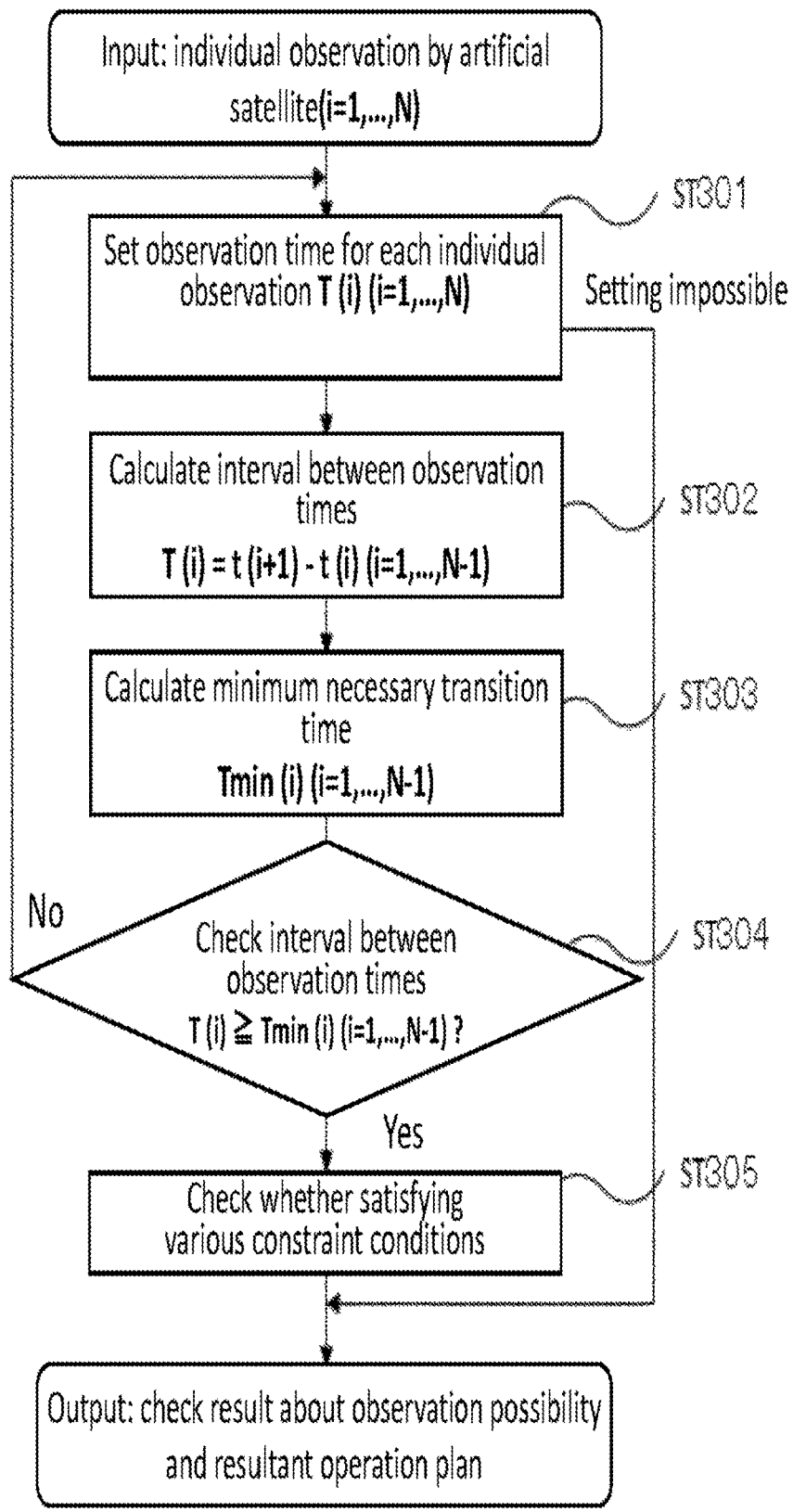
FIG. 4 is a flow chart showing the processing flow of an operation planning unit according to Embodiment 1 of the present invention.

Next, explanation will be made, using FIG. 4, about a process flow example of the operation planning unit 23 in a case where the artificial satellite observes the ground. The attitude control performance and the observation constraint conditions of the artificial satellite are set as operation parameters by the operation parameter setting unit 11 and stored in the satellite-side operation parameter storage 22.

It is assumed that operation parameters for N individual observations are given to the operation planning unit 23. In the following description, each of the individual observations is denoted by a symbol i (i=1, . . . , N) in the observation time order. In FIG. 4, when a combination of individual observations (i=1, . . . , N) is inputted, the observation time t(i) of each individual observation i is set in step ST301. The setting method will be described later.

Next, in step ST302, the differences (observation time intervals) between the observation times of the individual observations adjacent to each other in the observation time order are calculated. An observation time interval between individual observations i and i+1 is denoted by T(i). That is, T(i)=t(i+1)·t(i)=1, . . . , N·1).

Next, in step ST303, Tmin(i) (i=1, . . . , N−1) are calculated each of which is the minimum value of a necessary transition time (the minimum necessary transition time) between individual observations i and i+1.

Tmin (i) includes various kinds of time periods necessary between the observation time for the individual observation i and the observation time for the individual observation i+1, such as: a partial period out of the observation period (the necessary period from starting a single observation to ending it) for the individual observation i, the partial period being after the observation time t(i); a partial period out of the observation period for the individual observation i+1, the partial period before the observation time t(i+1); a time period necessary for a case where in order to change the sightline of the observation device in a period between the individual observation i and the individual observation i+1, an operation has to be performed each for changing the sight line direction DOB of an observation device OB and for changing the attitude PSA of the satellite SA provided with the observation device OB, the time period being the shortest for the changes; and, if necessary, a time period between the observation operations, the time period being for a procedure of turning on and off the power supplies for the observation devices.

For example, the time period necessary for changing the attitude of an artificial satellite can be obtained from the attitude at the individual observation i, the attitude at the individual observation i+1, and the artificial satellite performance to change the attitude, etc. The attitude at each observation can be obtained from the observation time and the geometric relation between the observation point and the orbit path of the satellite-side operation parameters stored in the satellite-side operation parameter storage 22. With respect to the performance to change the attitude of the artificial satellite, an attitude transition velocity (for example, angular velocity (degrees/second)) is stored as the artificial satellite performance of the satellite-side operation parameters. Furthermore, as onboard observation device performance among the artificial satellite performance, a sightline transition velocity (for example, angular velocity (degrees/second)) may be stored in the satellite-side operation parameter storage 22. Instead, these parameters may be integrated as an artificial satellite observation sightline transition velocity (for example, angular velocity (degrees/second)) and stored as artificial satellite performance. Moreover, an algorithm for changing an artificial satellite attitude according to the condition of the attitude may be stored as a satellite-side operation parameter in the satellite-side operation parameter storage 22 to calculate more accurately a time period for changing the attitude according to the algorithm. The time period required for an observation device to be turned on/off may be stored in the satellite-side operation parameter storage 22 as a satellite-side operation parameter representing the onboard observation device performance of the artificial satellite performance. Note that basically, the satellite-side operation parameters stored in the satellite-side operation parameter storage 22 are the operation parameters set by the operation parameter setting unit 11.

In step ST303, the minimum necessary transition time Tmin(i) (i=1, . . . , N·1) is calculated between all the individual observations, and then, in step ST304, comparison is made with the observation time interval T (i) obtained in step ST302. If T(i)<Tmin(i) is found in one of intervals between the individual observations, this means that, under such observation time setting, the minimum necessary transition time Tmin(i) does not satisfy the observation time interval T(i). Therefore, the process returns to step ST301 to set the observation times again. If T(i)≥Tmin(i) is satisfied in every interval between the individual observations (i=1, . . . , N·1), the process proceeds to the next step ST305.

In step ST305, it is checked whether various constraint conditions other than the observation time setting and the minimum necessary transition time, are satisfied. Such constraint conditions may include any constraint condition to check whether the artificial satellite can perform the operation plan by itself, such as a condition whether the observed image resolution is within a tolerance range, or a condition whether observation data to be stored does not exceed the data recorder capacity prepared in the artificial satellite. These conditions are stored in the satellite-side operation parameter storage 22 as the performance/observation constraint conditions of the artificial satellite. In step ST305, if any one of the set constraint conditions is not satisfied, the operation planning unit 23 outputs a determination result that the observation is impossible. When all of the constraint conditions are satisfied and then the observation times are properly set, the operation planning unit 23 determines that the observation is possible and outputs an operation planning result which includes observation times for individual observations.

Figure 5:
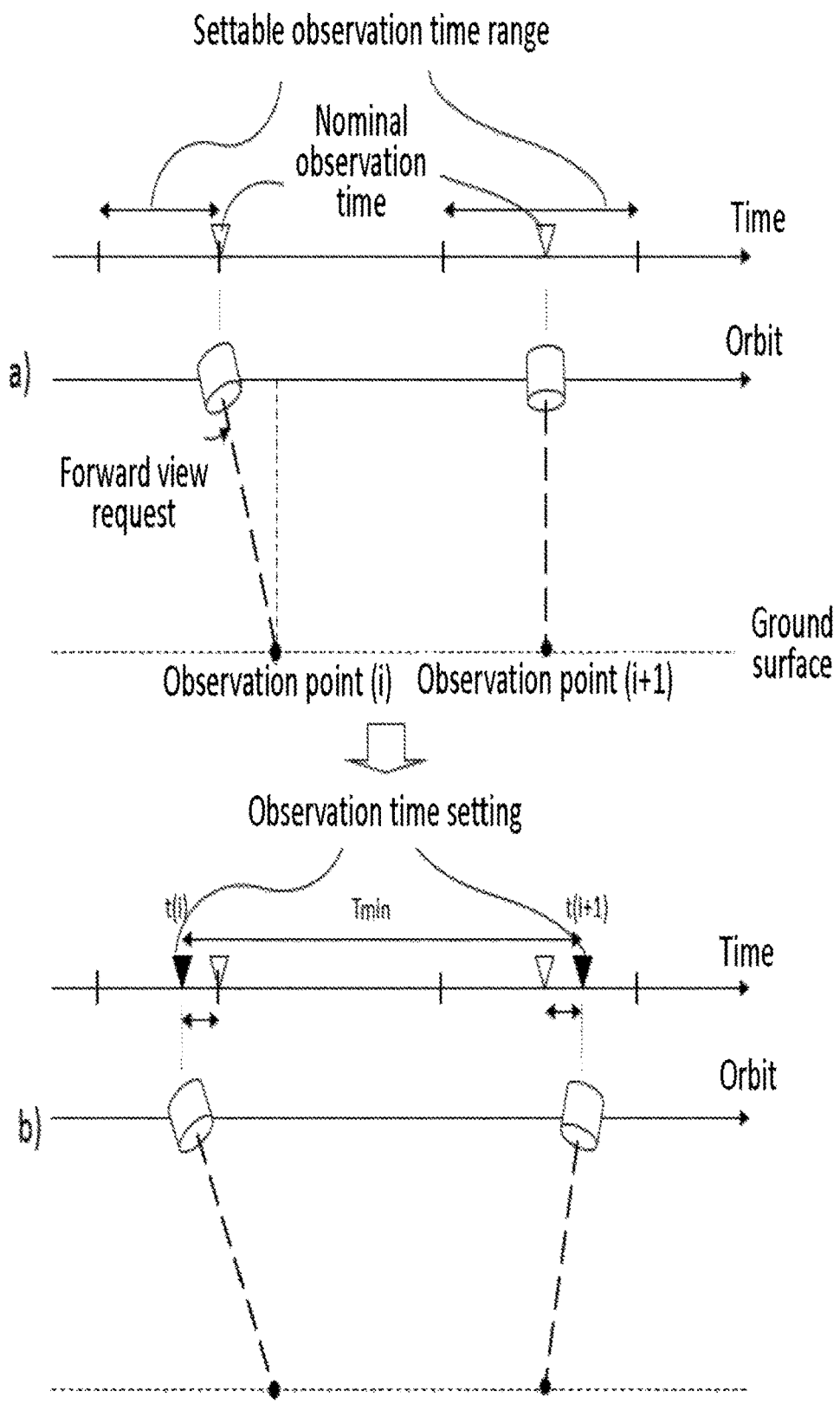
FIG. 5 are schematic diagrams for explaining a method of setting an observation time in the operation planning unit according to Embodiment 1 of the present invention.

Next, the observation time setting in step ST301 will be described using FIG. 5. The figures show only two individual observations i and i+1. FIG. 5(*a*) shows that forward view is requested in the individual observation i, and thus, the nominal observation time and the settable observation time range are set before the time to pass the observation point; and FIG. 5(*a*) also shows that in the individual observation i+1, the nominal observation time is set at the time to pass the observation point. Here, the nominal observation time and the settable observation time range are calculated from the coordinate positions of the observation target, the model orbit parameters, the constraint of the pointing angle, and a request such as a forward view, or a backward view, which are included as the operation parameters.

Here, it is assumed that as initial settings, the observation time t(i) and the observation time t(i+1) of the individual observations are set to their respective nominal observation times. Then, when the observation time interval T (i) obtained in step ST302 is, as shown in FIG. 5(*a*), smaller than the minimum necessary transition time Tmin (i) obtained in step ST303, a choice for returning to step ST301 is made in step ST304, thereby setting the observation times again.

In that case, as shown in FIG. 5(*b*), each of the observation times t(i) and t(i=1) is set at a time shifted forward or backward from its nominal observation time so that the difference from its nominal observation time will be reduced as much as possible and the observation time interval T (i) will be Tmin (i) or longer.

In a case where the minimum necessary transition time Tmin(i) obtained in step ST303 is determined depending on the observation times a (i) and t(i+1), the minimum necessary transition time Tmin(i) obtained according to the observation times t(z) and t(i+1) which have been set as described above may become longer than the observation time interval T (i), whereby the process may return again to step ST301. Even in such a case, by repeating calculations according to the procedure from step ST301 to step ST304, observation times can be set so that all observation time intervals will become longer than the minimum necessary transition times.

Or, another possibility is that it becomes impossible to set an observation time within a settable observation time range in step ST301. More specifically, this occurs when Tmin (i) obtained in step ST303 is longer than the time period between the lower limit of the settable observation time range for the individual observation i and the upper limit of the settable observation time range of individual observation i+1. In such a case, the process of step ST301 goes out of the calculation loop and the operation planning unit 23 outputs a result that the observation is impossible.

Note here that in the above explanation in which FIG. 5 are used, a case has been shown which includes, for simplification, only two individual observations i and i+1. In a case which includes three or more individual observations, each of the observation times t(i) (i=1 . . . N) is set, in the same way as described above, so that the difference from its nominal observation time will be reduced as much as possible, and the observation time interval T (i) (i=1, . . . , N−1) will be Tmin (i) or longer.

As described so far, the observation times are set according to the minimum necessary transition time in which the performance of the artificial satellite and the observation constraint conditions are taken into account, and on the basis of the pointing angle constraint etc. set in the operation parameter setting unit 11; therefore, the operation planning unit 23 can produce an operation plan satisfying observation requests as much as possible, while taking the performance of the artificial satellite and other constraints thereof into account.

On the other hand, the ground-side operation plan estimation unit 13 has the same functions as the satellite-side operation planning unit 23, to produce an operation plan on the ground side in the same way as the operation planning unit 23 does. In doing so, the information of the operation parameters stored in the ground-side operation parameter storage 12 is the same as the information of the operation parameters stored in the satellite-side operation parameter storage 22. Also, a solution for calculating an operation plan satisfying the constraint conditions determined by these operation parameters is the same between the ground-side operation plan estimation unit 13 and the satellite-side operation planning unit 23. Therefore, the ground-side operation plan produced by the operation plan estimation unit 13 and the satellite-side operation plan produced by the operation planning unit 23 become the same. This make it possible to predict in advance on the ground about the satellite-side operation plan, in other words, the operation plan on the orbit such as whether to drive the antenna, the time when the antenna enters into a state for tracking a ground station, the time when the communication devices are turned on, etc.

Here, the solution for calculating an operation plan satisfying the constraint conditions determined by the operation parameters includes the processing idea shown in the process flow example of the operation planning unit 23. Therefore, that the solutions for calculating an operation plan are the same means, that circuits each perform the same process flow, or that computers each are programmed to perform the same process flow. Thus, as long as the process flows are the same, the circuits or the programs (subroutines) may differ in details or may be completely the same.

In other words, the operation plan estimation unit 13 estimates a satellite-side operation plan to be produced by the satellite-side operation planning unit 23, to calculate on the ground side the same operation plan as the ground-side operation plan. The operation planning unit 23 and the operation plan estimation unit 13 have the same function and produce respective operation plans by using the information of the same operation parameters (satellite-side operation parameters and ground-side operation parameters) and by using the same solution. Therefore, it is obvious that the ground-side operation plan and the satellite-side operation plan will be the same.

Next, according to the operation plan produced by the operation planning unit 23, the operation control unit 24 actually controls the artificial satellite attitude, the antenna, the turning on/off of the communication device, etc. at the planned timings. In doing so, it is necessary, for example in the example shown in FIG. 2, to calculate the moment-by-moment target value of the antenna angle from the time t1 to the time t2 in order to make the antenna A1 track the ground station G1. The antenna angle is determined depending on the position and the attitude of the satellite on the orbit and on the location of the ground station. For the satellite orbit, the model orbit stored in the satellite-side operation parameter storage 22 is used.

On the other hand, the ground-side operation control estimation unit 14 has the same function as the satellite-side operation control unit 24 to estimate or simulate according to the ground-side operation plan produced by the operation plan estimation unit 13, the operation control in the operation control unit 24 described above. In the example shown in FIG. 2, the moment-to-moment antenna angle from the time t1 to the time t2 can be obtained to be displayed on a mobile terminal etc. for the operator's checking purpose. Furthermore, in response to the operation control estimation result obtained by the operation control estimation unit 14, it is also possible to determine the necessity for changing the operation plan and to issue commands for changing the plan. For example, in a case where an undesirable attitude behavior is found in an operation control estimation result, chances to transmit commands before actually executing the planned operation can be utilized to transmit to the artificial satellite, the commands for changing the plan or stopping the execution.

Instead of the method using a model orbit as the satellite orbit, the operation control unit 24 can also use a normal method in which orbit prediction values are calculated onboard on the basis of information of the GNSS (Global Navigation Satellite System) receiver etc. installed on the satellite. In this case, the operation control unit 24 is to control the artificial satellite operation using the orbit prediction values which are calculated using the information of the GNSS receiver installed in the artificial satellite. According to this method, it is normally expected that the error amount of the orbital position is smaller than when the model orbit is used, further reducing antenna pointing errors.

In a case where the satellite-side operation control unit 24 uses the onboard orbit prediction values as the satellite orbit, those values cannot be known in advance on the ground side. Therefore, the antenna angle obtained on the ground side takes a value which differs by an amount of the orbit error (fine adjustment) from the antenna angle actually obtained on the orbit. This causes a difference between the artificial satellite operation predicted by the operation control estimation unit 14 and the actual operation state. However, the purpose of operation control predictions by the ground station is to roughly know the antenna angle etc.; therefore, the difference brought about by the fine adjustment of the antenna angle etc. will not cause any problem in the course of the operation.

Figure 6:
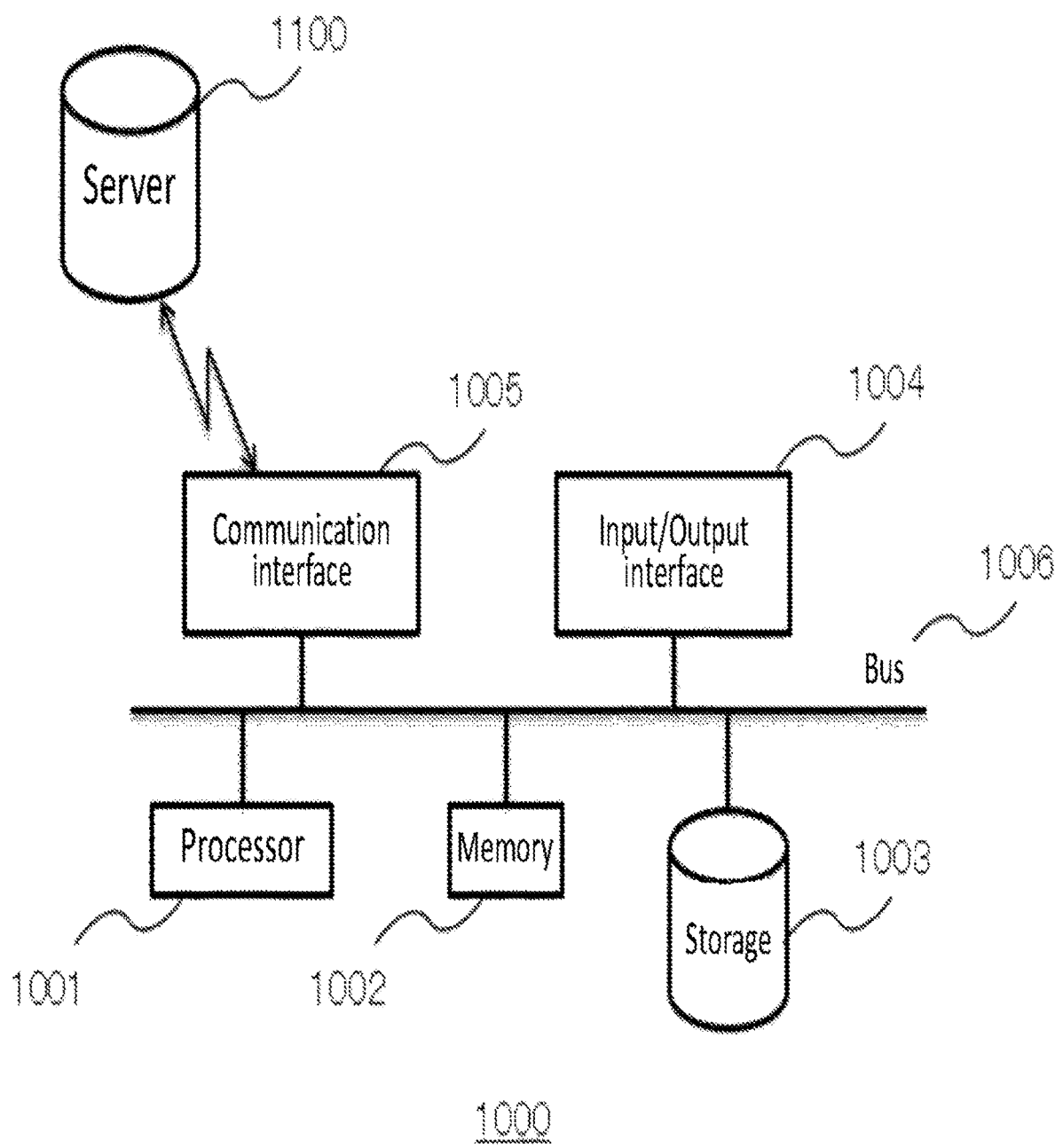
FIG. 6 is a diagram showing a computer hardware configuration example realizing a ground-side operation planning apparatus according to Embodiment 1 of the present invention.

FIG. 6 is a diagram showing a hardware configuration example of a computer 1000 realizing the ground-side operation planning apparatus 10 according to the present embodiment. The hardware configuration of the computer 1000 to realize the ground-side operation planning apparatus 10 shown in FIG. 6 includes, for example, a processor 1001, a memory 1002, a storage 1003, an input/output interface 1004, and a communication interface 1005. Note that the processor 1001, the memory 1002, the storage 1003, the input/output interface 1004, and the communication interface 1005 are connected with each other, for example, via a bus 1006.

The programs describing respective functions of the operation parameter setting unit 11, the operation plan estimation unit 13, and the operation control estimation unit 14 are installed in the storage 1003, and the programs are loaded, as required, into the memory 1002 to function as the respective units with the processor 1001. The storage 1003 also functions as the ground-side operation parameter storage 12 to store ground-side operation parameters. Instead, the ground-side operation parameters may be stored in a server 1100 connected with the computer 1000 via network to be read out via a communication interface 1005. In this case, the server 1100 functions as the ground-side operation parameter storage 12. Also, the communication interface 1005 functions as the operation parameter transmission unit 15.

When making the operation parameter setting unit 11 function as mentioned above, the operator may give an instruction via the input/output interface 1004. Also, the operation plan calculated by the operation plan estimation unit 13 and the prediction result of the satellite-side operation control (such as the time history of the antenna driving angle and the satellite attitude) calculated by the operation control estimation unit 14 can be displayed or outputted by a display or a printer via the input/output interface 1004.

Note that, in this example, the functions of the operation parameter setting unit 11, the operation plan estimation unit 13, and the operation control estimation unit 14 are all realized on the same computer; however, another configuration may be taken in which some of these functions are realized on another computer in the same way. For example, in a case where the function of the operation parameter setting unit 11 is realized on another computer (illustration omitted) other than the computer 1000 mentioned above, the set operation parameters are to be stored in the server 1100 and accessed from the computer 1000 via the communication interface 1005.

Also, the computer hardware configuration for realizing the satellite-side operation planning apparatus 20 according to the present embodiment may be the same as shown in FIG. 6. In this case, the programs describing respective functions of the operation planning unit 23 and the operation control unit 24 are installed in the storage 1003, and the programs are loaded, as required, into the memory 1002 to function as the respective units with the processor 1001. The storage 1003 functions as the satellite-side operation parameter storage 22 to store the satellite-side operation parameters.

Note that, in this example, the functions of the operation planning unit 23 and the operation control unit 24 are all realized on the same computer; however, another configuration may be taken in which one of the functions may be realized on another computer in the same way. Also, the communication interface 1005 shown in FIG. 6 may function as a receiver to receive the operation parameters.

As described above, the ground side and the satellite side use the same operation parameter information to produce respective operation plans, so that the ground side can predict in advance the satellite-side operation plan to be produced in the satellite side, whereby the uncertainty caused by autonomous operations can be removed. Thus, the autonomous operations reduce operation loads and can make it possible to efficiently plan and execute the ground station operation for receiving telemetry from the artificial satellite and transmitting commands to the artificial satellite. Also, it becomes possible to flexibly and efficiently perform the artificial satellite operation, for example, it becomes possible to change, as required, part of the operation plan produced on the orbit by using commands from the ground.

The autonomous operation planning system for an artificial satellite includes: an operation parameter setting unit 11 to set at least one operation parameter to be used for operating the artificial satellite; a satellite-side operation parameter storage 22 to store the at least one operation parameter; an operation planning unit 23 to calculate a satellite-side operation plan for the artificial satellite, using at least one satellite-side operation parameter of the satellite-side operation parameter storage; an operation control unit 24 to control an operation of the artificial satellite, using the at least one satellite-side operation parameter and the satellite-side operation plan; a ground-side operation parameter storage 12 to store the same operation parameter information as information on the at least one satellite-side operation parameter; an operation plan estimation unit 13 to estimate the satellite-side operation plan as a ground-side operation plan, using at least one ground-side operation parameter; and an operation control estimation unit 14 to estimate the operation of the artificial satellite controlled by the operation control unit, using the at least one ground-side operation parameter and the ground-side operation plan. Therefore, uncertainty about the artificial satellite operation can be removed, which thereby leads to efficient operation of an artificial satellite.

Also, the ground-side operation planning apparatus 10 includes: an operation parameter setting unit 11 to set at least one operation parameter to be used for operating the artificial satellite; a ground-side operation parameter storage 12 to store information on at least one operation parameter which has same information as that to be stored in a satellite-side operation parameter storage 22; an operation plan estimation unit 13 to estimate, using the at least one ground-side operation parameter stored in the ground-side operation parameter storage 12, a satellite-side operation plan calculated in the artificial satellite side using the at least one operation parameter of the satellite-side operation parameter storage 22; and an operation control estimation unit 14 to use the at least one ground-side operation parameter and the ground-side operation plan estimated by the operation plan estimation unit 13 to estimate the artificial satellite's operation control to be performed using the satellite-side operation parameter and the satellite-side operation plan. Therefore, uncertainty about the artificial satellite operation can be removed, which thereby leads to efficient operation of an artificial satellite.

Embodiment 2

Figure 7:
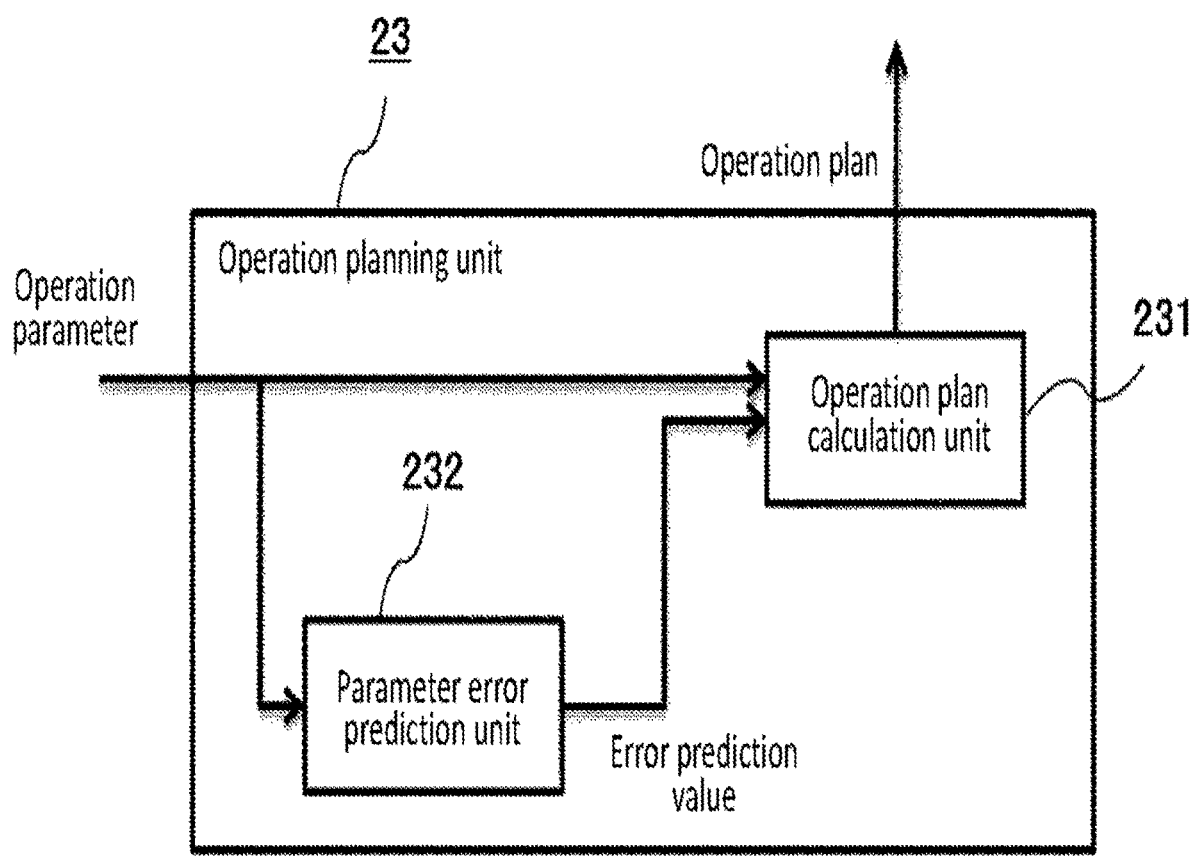
FIG. 7 is a block diagram showing the configuration of an operation planning unit according to Embodiment 2 of the present invention.
Figure 8:
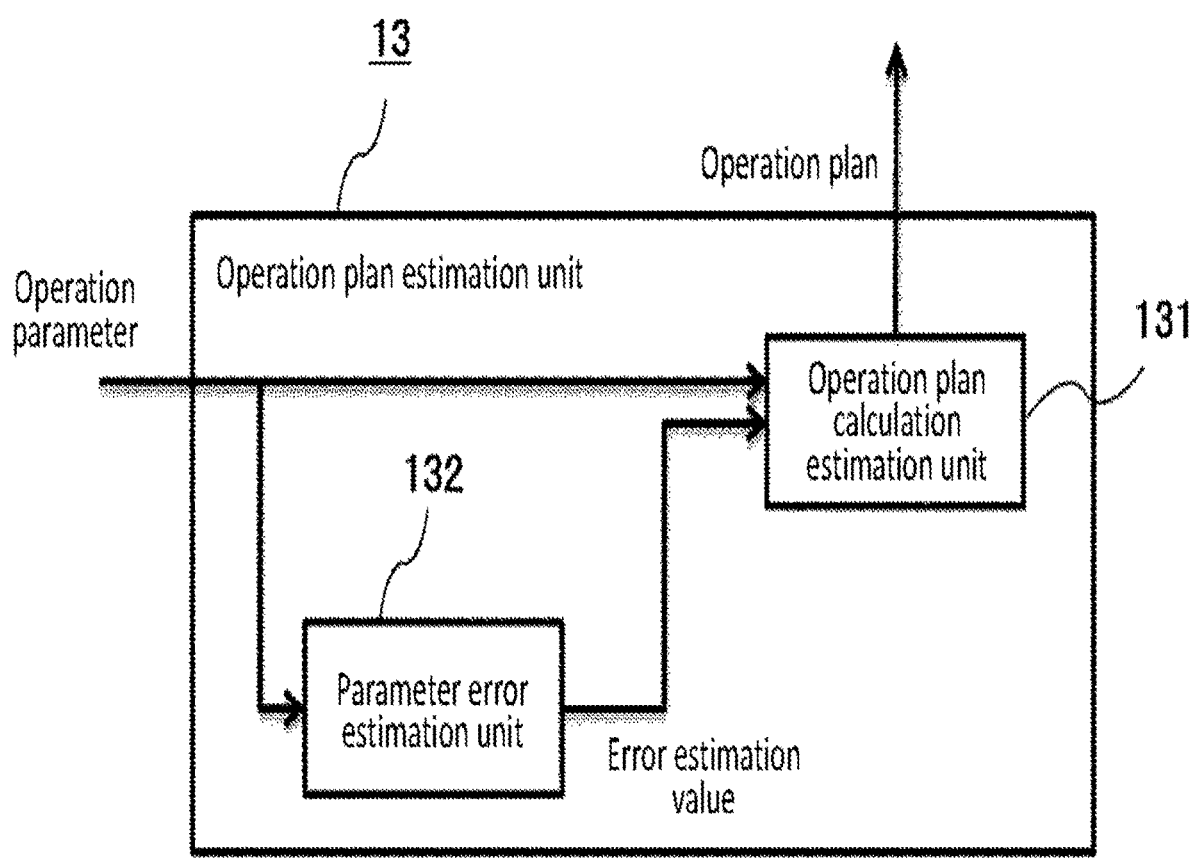
FIG. 8 is a block diagram showing the configuration of an operation plan estimation unit according to Embodiment 2 of the present invention.

FIG. 7 is a block diagram showing the configuration of an operation planning unit 23 according to Embodiment 2 of the present invention. Also, FIG. 8 is a block diagram showing the configuration of an operation plan estimation unit 13 according to Embodiment 2 of the present invention.

In the autonomous operation planning system according to the present embodiment, the units other than the just above-mentioned units—namely, an operation parameter setting unit 11, a ground-side operation parameter storage 12, an operation control estimation unit 14, an operation parameter transmission unit 15, a satellite-side operation parameter storage 22, and an operation control unit 24—are the same as in Embodiment 1. The main difference from Embodiment 1 is that parameter errors are predicted and taken into account to produce an operation plan. In the present embodiment 2, the operation planning unit 23 includes an operation plan calculation unit 231 and a parameter error prediction unit 232 in the satellite side, and the operation plan estimation unit 13 includes an operation plan calculation estimation unit 131 and a parameter error estimation unit 132 on the ground side.

The parameter error prediction unit 232 and the parameter error estimation unit 132 determine, on the basis of a model, the error sizes of the operation parameters in accordance with a lapse time from when the operation parameters are uploaded. As for such an error model, a simplest model can be used which express the error amount in accordance with the lapse time, in a simple numerical expression such as a polynomial. Besides such a simple numerical expression, a more precise version of the error model can be used on the basis of a physical model of each parameter. For example, with respect to the model orbit parameters, an orbit error model can be used which more precisely represents the real orbit on the basis of a physical model of the perturbation power applied to the satellite moving along an orbit.

Whatever the error model is, the error model represents the error amount of the operation parameter in the form of a numerical expression, a numerical table, or the like so that the error estimation values outputted by the parameter error estimation unit 132 on the ground side will be the same as the error prediction value outputted by the parameter error prediction unit 232 of the satellite-side.

The operation plan calculation unit 231 uses the operation parameters and the error prediction values calculated by the parameter error prediction unit 232, to produce the satellite-side operation plan. Similarly, the operation plan calculation estimation unit 131 uses the operation parameters and the error estimation values calculated by the parameter error estimation unit 132 to produce the ground-side operation plan.

Figure 9:
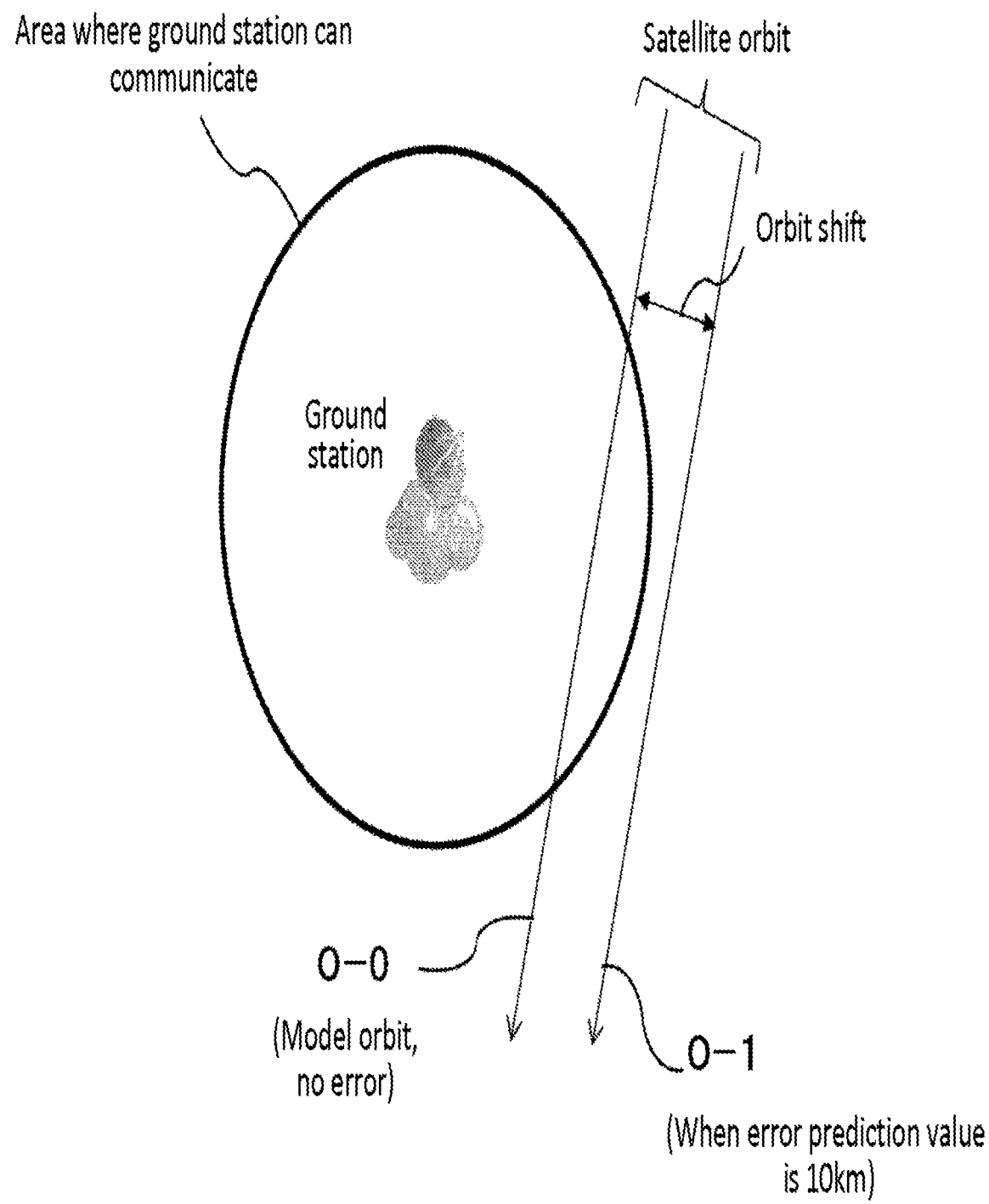
FIG. 9 is a schematic diagram for explaining operation-plan production, in which an error prediction value is taken into account, according to Embodiment 2 of the present invention.

Using FIG. 9, an example will be explained in which the error prediction values of a model orbit are reflected to an operation plan as shown in FIG. 2 for turning the antenna installed on the satellite toward the ground station. FIG. 9 is a schematic diagram for explaining operation-plan production in which error prediction values are taken into account. To be more specific, it shows the situation of the artificial satellite moving through the area where the ground station can communicate or thereabout. In a case when the satellite orbit is calculated using the model orbit O-0, the satellite is to pass the inside of the area where the ground station can communicate, so that it will be determined that the satellite can communicate with the ground station during the passage time period. The times t1 and t2 shown in FIG. 2 will be set on the basis of the timing, as described above, when the satellite on the orbit passes the area where the ground station can communicate.

On the other hand, in a case when the error prediction value of the model orbit outputted by the parameter error prediction unit 232 is, for example, 10 km, then it is predicted with a predetermined probability, that the artificial satellite moves along an orbit O-1 which is 10 km shifted from the model orbit in a direction opposite to the ground station, i.e., it is predicted that the artificial satellite, as shown in FIG. 9, is to pass outside the area where the ground station can communicate. In this case, if the operation plan calculation unit 231 produces an operation plan to communicate with the ground station and the actual orbit shifts 10 km, it will become impossible to conduct the operation plan.

To cope with this, the operation plan calculation unit 231 according to Embodiment 2 takes an error prediction value (10 km in this example) into account, to produce an operation plan in which a possibility to cause such an impossible operation plan is removed. A method for removing a possibility to cause such an impossible operation plan is, for example, that first, an operation plan is produced under an assumption of no errors, and then, the operation plan is shifted by error prediction values obtained for the operation plan, and then it is checked whether each of the constraint conditions is satisfied. Also, another method is that, when producing an operation plan, the constraint conditions based on the operation parameters are made stricter by the obtained error prediction values, to produce the operation plan.

On the ground side, the parameter error estimation unit 132 outputs error estimation values, which are the same values as the error prediction values outputted by the parameter error prediction unit 232 in the satellite side. Furthermore, by taking the error prediction values into account, the operation plan calculation unit 231 removes a possibility to cause an impossible operation (unlikely to conduct the plan), to calculate a satellite-side operation plan. Similarly, by taking the error estimation values into account, the operation plan calculation estimation unit 131 removes, similarly to the operation plan calculation unit 231, a possibility to cause an impossible operation (unlikely to conduct the plan), to calculate a ground-side operation plan.

Figure 10:
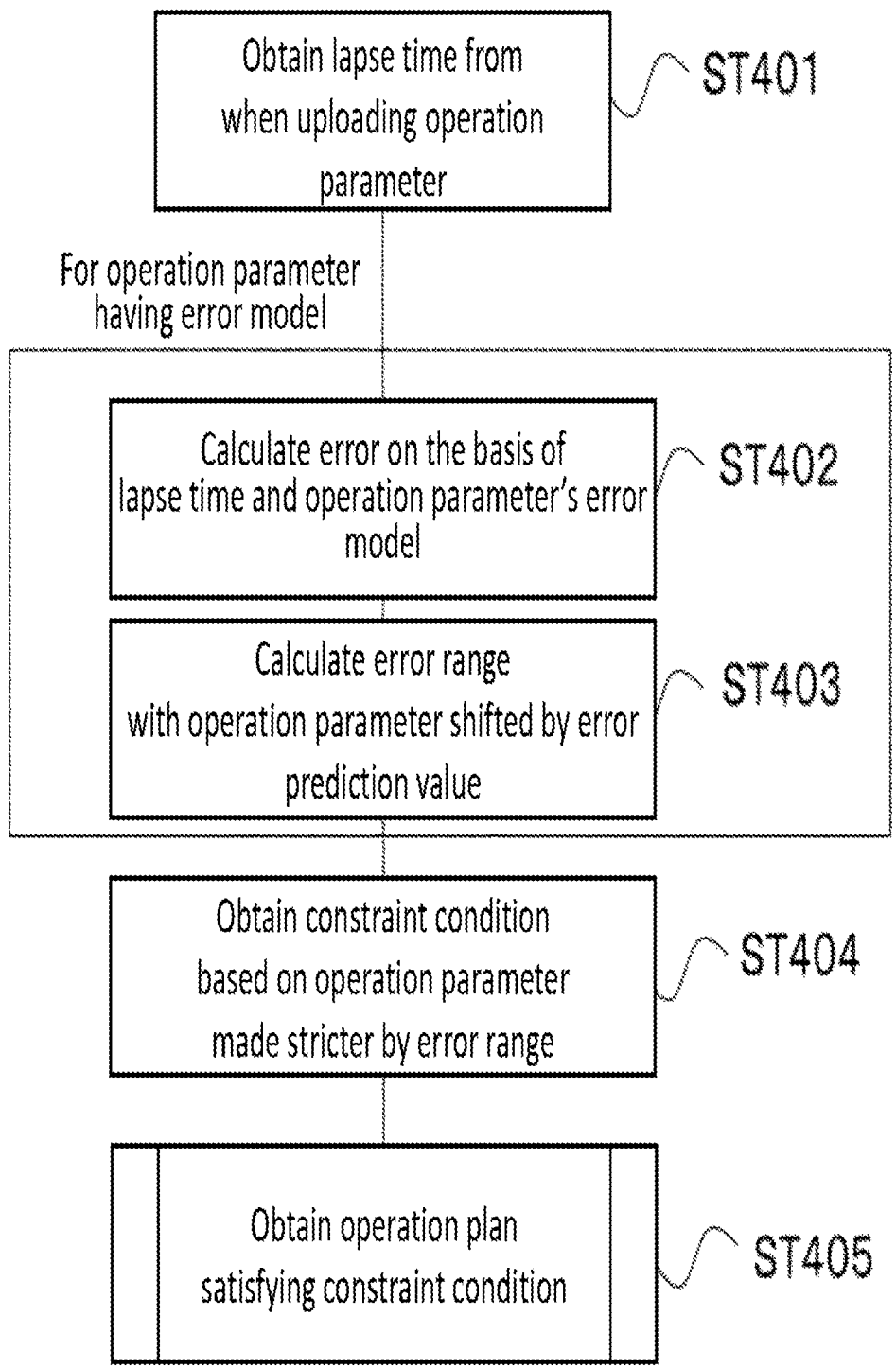
FIG. 10 is a flow chart showing the processing flow of an operation planning unit according to Embodiment 2 of the present invention.

FIG. 10 is a flow chart showing the processing flow of the operation planning unit 23 according to Embodiment 2 of the present invention. FIG. 10 shows an example of the flow of a processing including that of the operation plan calculation unit 231 and the parameter error prediction unit 232 in the operation planning unit 23 shown in FIG. 7.

First, in step ST401, the parameter error prediction unit 232 obtains a lapse time from the time point when the operation parameters are uploaded as the satellite-side operation parameters to the satellite-side. Next, the parameter error prediction unit 232 predicts, out of operation parameters, the errors of operation parameters that have error models as described above; and then, the parameter error prediction unit takes the error prediction values into account, to remove a possibility to cause an impossible operation (unlikely to conduct the plan). In the following, specific processing will be explained step by step.

In step ST402, the parameter error prediction unit 232 obtains error prediction values after the lapse time, using the lapse time obtained at ST401 and the error models of target operation parameters for error estimation. As described above, the error models include a model representing the error amount in accordance with the lapse time in a form of a numerical expression such as a polynomial, and a model basing on a physical model for each parameter; and, especially for the model orbit parameters, the error models include a model basing on the physical model of the perturbation power applied to the satellite's orbital motion. More specifically, because each error is expressed as a numerical expression or a numerical table, the numerical expression or numerical table for each of the target operation parameters is read out to obtain an error prediction value at a specific lapse time.

Next, in step ST403, the parameter error prediction unit 232 calculates, with respect to the target operation parameters, error ranges which are shifted by the error prediction values obtained in ST402. This means, for example, that an orbit shifted by the error prediction value from the model orbit shown in FIG. 9 is regarded as an orbit in the error range.

In steps ST402 to ST403 described above, the processing about the operation parameters for which error models are set is performed, and then the process proceeds to step ST404. In step ST404, the parameter error prediction unit 232 sets the constraint conditions based on the operation parameters obtained by the operation planning unit 23 so that the constraint conditions will become stricter by the error ranges obtained in steps ST402 and 403. The constraint conditions set in this way are referred to as constraint conditions with errors considered. For example, the radius of the area, shown in FIG. 9, where the ground station can communicate (or the angle parameter equivalent thereto) will be set inward by 10 km that is the error prediction value of the orbit.

Next, in step ST405, the operation planning unit 23 produces an operation plan which satisfies the errors-considered constraint conditions obtained in step ST404. Through the flow described above, an operation plan is produced in which error prediction values are taken into account to remove the possibility to cause an impossible operation (unlikely to conduct the plan).

FIG. 6 is also a diagram showing an example of a hardware configuration of a computer 1000 which realizes a ground-side operation planning apparatus 10 according to the present embodiment, which includes: a processor 1001; a memory 1002; a storage 1003 (substitutable with a memory); an input/output interface 1004: and a communication interface 1005.

The programs describing respective functions of the operation parameter setting unit 11, the operation plan estimation unit 13, the operation control estimation unit 14, and the operation parameter transmission unit 15 are installed in the storage 1003. Also, the programs are loaded, as required, into the memory 1002 and then executed by the processor 1001 to function as the operation parameter setting unit 11, the operation plan estimation unit 13, the operation control estimation unit 14, and the operation parameter transmission unit 15. The storage 1003 functions as the ground-side operation parameter storage 12 to store the ground-side operation parameters.

Also, the computer hardware configuration to realize the satellite-side operation planning apparatus 20 according to the present embodiment may be the same as that shown in FIG. 6. In this case, the programs describing respective functions of the operation planning unit 23 and the operation control unit 24 are installed in the storage 1003, and are loaded, as required, into the memory 1002 and then executed by the processor 1001 to function as the operation planning unit 23 and the operation control unit 24. The storage 1003 functions as the satellite-side operation parameter storage 22 to store the satellite-side operation parameters.

As described above, the operation planning unit 23 includes the parameter error prediction unit 232 to calculate error prediction values of the satellite-side operation parameters, and calculates the satellite-side operation plan using the calculated error prediction values. Also, the ground-side operation plan estimation unit 13 includes the parameter error estimation unit 132 to calculate error estimation values of the ground-side operation parameters, and calculates a ground-side operation plan using the calculated error estimation values. Note here that, the parameter error estimation unit 132 and the parameter error prediction unit 232 use a same solution; and the operation plan calculation estimation unit 131 and the operation plan calculation unit 231 use a same solution. To be more specific, the operation plan estimation unit 13 performs the same processing as the process flow shown in FIG. 10 described above. Therefore, uncertainty about the artificial satellite operation, such as production of an operation plan that neither the satellite side nor the ground side can perform, can be removed, which thereby leads to an efficient operation of an artificial satellite.

Embodiment 3

Figure 11:
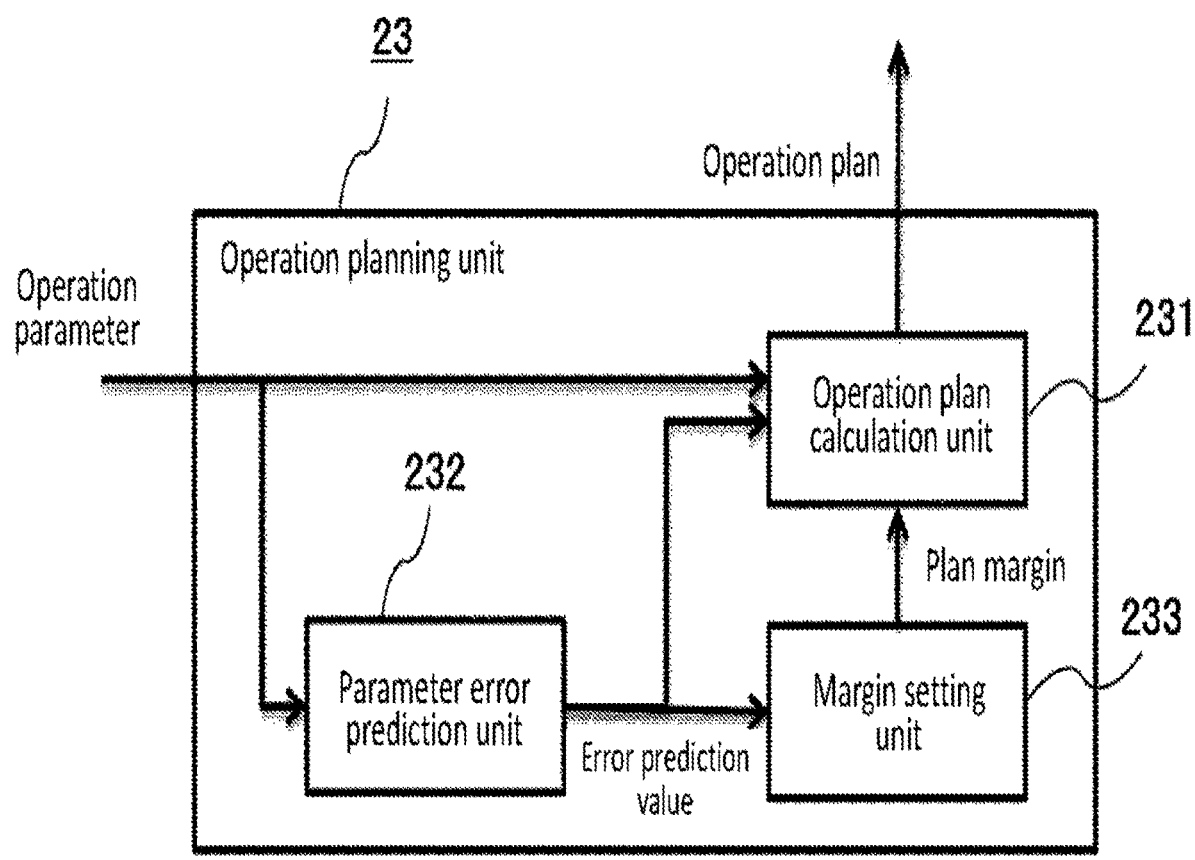
FIG. 11 is a block diagram showing the configuration of an operation planning unit according to Embodiment 3 of the present invention.
Figure 12:
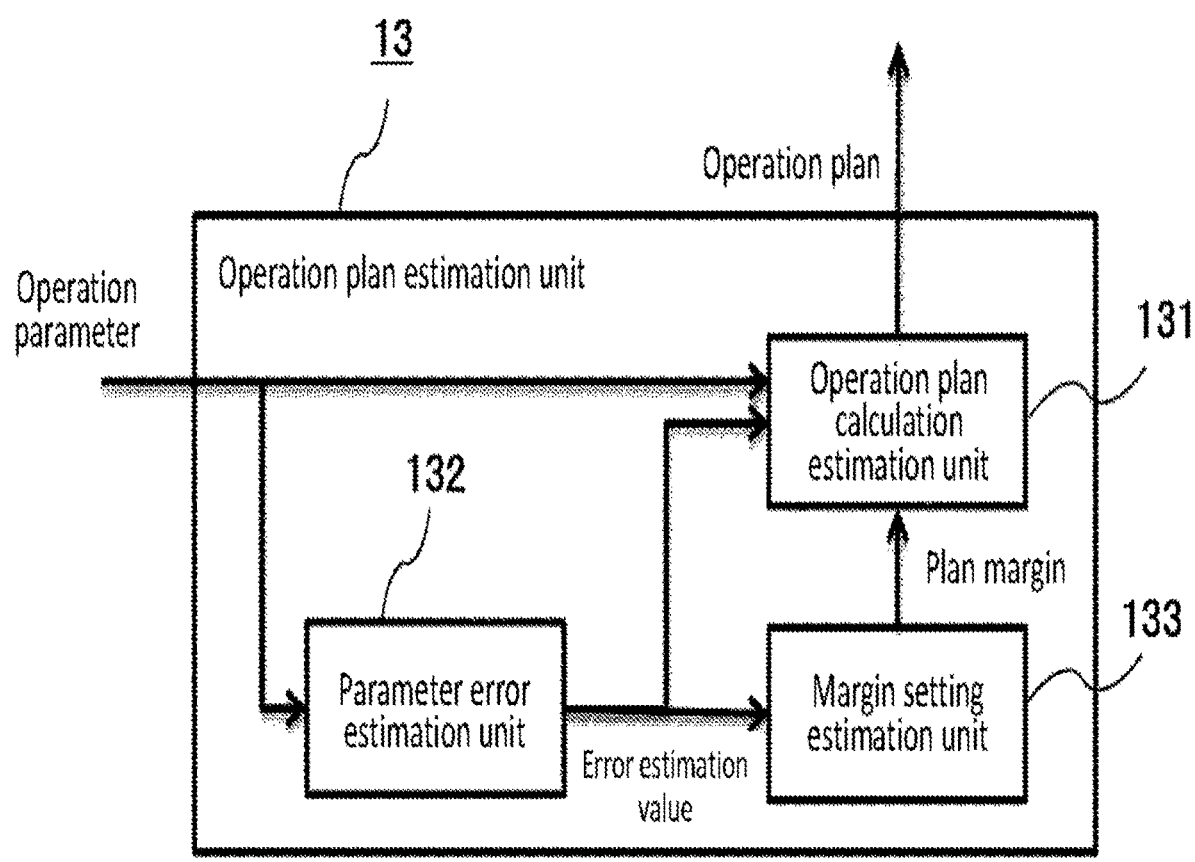
FIG. 12 is a block diagram showing the configuration of an operation plan estimation unit according to Embodiment 3 of the present invention.

FIG. 11 is a block diagram showing the configuration of an operation planning unit 23 according to Embodiment 3 of the present invention. Also, FIG. 12 is a block diagram showing the configuration of an operation plan estimation unit 13 according to Embodiment 3 of the present invention. In an autonomous operation planning system according to the present embodiment 3, other components—i.e. an operation parameter setting unit 11, an operation parameter storage 12, an operation control estimation unit 14, an operation parameter transmission unit 15, a satellite-side operation parameter storage 22, and an operation control unit 24—are the same as those in Embodiment 2. In the present embodiment 3, the operation planning unit 23 of the satellite side includes a margin setting unit 233 in addition to an operation plan calculation unit 231 and a parameter error prediction unit 232. On the basis of an error prediction value outputted from the parameter error prediction unit 232, the margin setting unit 233 changes the value of a satellite-side plan margin to be used in the operation plan calculation unit 231.

Similarly, the operation plan estimation unit 13 of the ground side includes a margin setting estimation unit 133 in addition to an operation plan calculation estimation unit 131 and a parameter error estimation unit 132. On the basis of an error estimation value outputted from the parameter error estimation unit 132, the margin setting estimation unit 133 changes the value of a ground-side plan margin to be used in the operation plan calculation estimation unit 131. The parameter error prediction unit 232 and the parameter error estimation unit 132 have the same function, so that an error prediction value and an error estimation value, respectively calculated by them, become the same value.

Also, on the basis of the error prediction value and the error estimation value, the same plan margin is to be produced from each of the margin setting unit 233 and the margin setting estimation unit 133 which have the same function. Having the same function, the operation plan calculation unit 231 and the operation plan calculation estimation unit 131 are to produce the same operation plan each by using the operation parameters; either the error prediction value or the error estimation values; and the plan margins.

Here, explanation will be made about plan margins. For example, in the operation plan example shown in FIG. 2, an operation plan produced by the operation planning unit 23 predetermines the time t1 etc. to turn the antenna toward the ground station. Constraint conditions such as the drive range of the antenna and the upper limit of the drive velocity are taken into account to calculate the time t1 etc. Then, the operation control unit 24 uses the orbit prediction values calculated onboard on the basis of the information of the GNSS receiver etc. installed on the satellite; that is, the operation control unit uses information about an orbit closer to the actual one to calculate, from moment to moment, the target value of the actual antenna driving angle. In doing so, if the artificial satellite orbit is shifted in a direction away from the ground station as shown in FIG. 9, the antenna driving angle obtained by the operation control unit 24 sometimes becomes larger than the antenna driving angle planned by the operation planning unit 23. Therefore, it is necessary that a constraint condition such as an antenna drive range to be taken into account by the operation planning unit 23 is set to a value smaller than the actual constraint condition to be taken into account by the operation control unit 24. A margin which is given, as described above, to a constraint value etc. in planning an operation is defined as a plan margin. The operation planning unit 23 produces an operation plan so that the operation plan will satisfy a constraint condition (a constraint condition in which the plan margin is taken into account) whose value (range) is made smaller than the actual constraint condition by the amount of the plan margin.

Other examples of the plan margin are margins for the upper limits of torque and a rotation rate, etc. of the actuator controlling a reaction wheel etc. to be used in changing the satellite attitude in the example shown in FIG. 3. The smaller these upper limits are set, the attitude maneuver times T5 and T6 planned by the operation planning unit 23 become longer. Therefore, even in a case where a larger satellite attitude change is actually required in the operation control unit 24, there is less possibility that the attitude maneuver will be impossible.

How large a plan margin should be given, in other words, how large the difference should be given to the constraint values between the operation planning unit 23 and the operation control unit 24, depends on how large the error amount of the operation parameter should be assumed. A plan margin with a sufficient allowance could prevent the operation plan from becoming unattainable; however, an extreme allowance would result in a conservative operation plan, failing to fully utilize the performance of the artificial satellite. For example, a too large margin given for an antenna driving angle would produce an inconvenient plan in which communication with the ground station is possible only when the satellite is positioned right over the ground station or therearound where the driving angle is sufficiently small.

Figure 13:
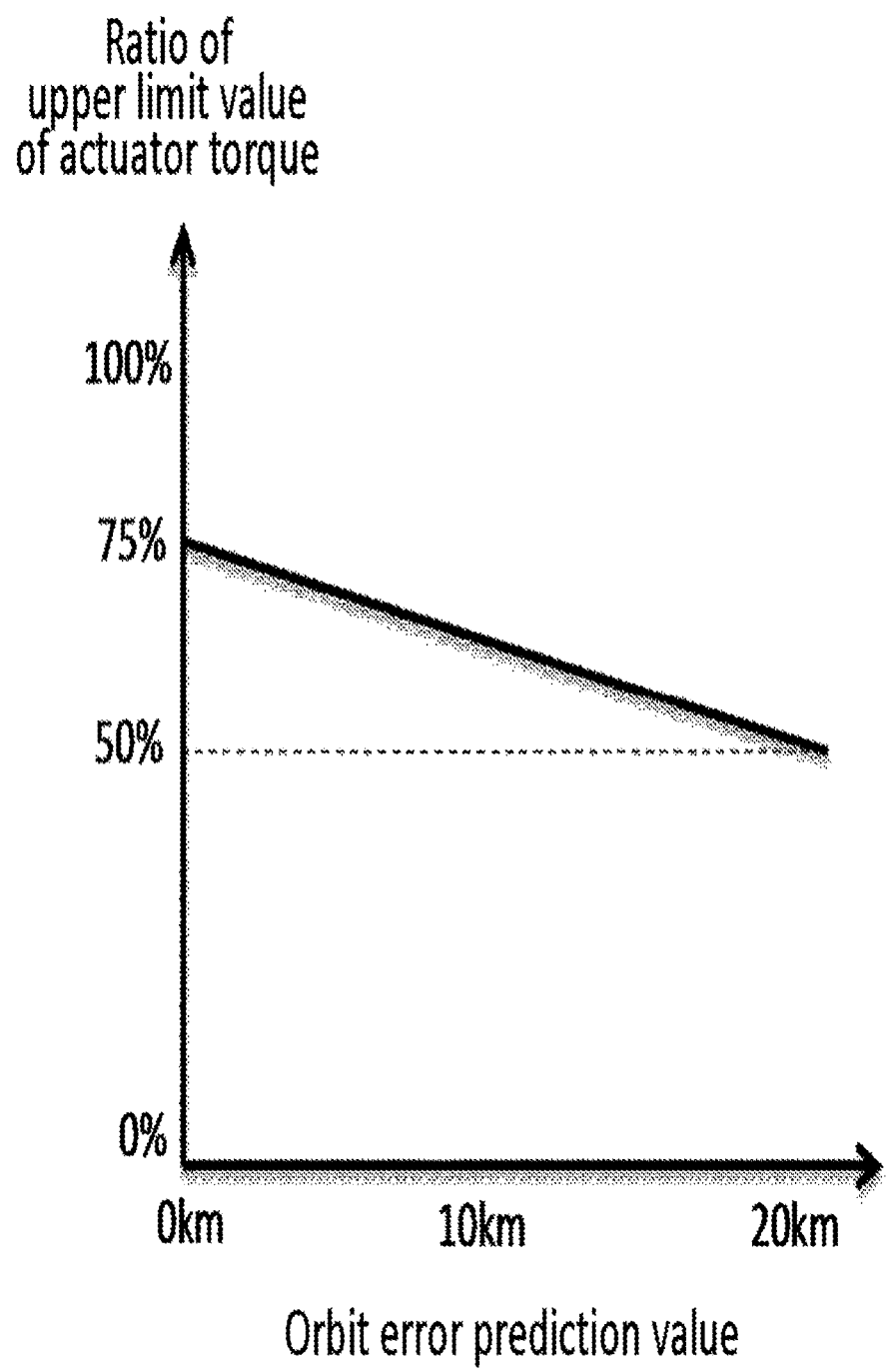
FIG. 13 is a schematic graph showing an example of setting a margin based on an error prediction value according to Embodiment 3 of the present invention.

Thus, in the present embodiment 3, the margin setting unit 233 and the margin setting estimation unit 133 change a satellite-side plan margin according to the error prediction value of an operation parameter. FIG. 13 is a schematic graph showing an example of setting a margin based on an error prediction value. To be more specific, it shows a setting example in which a plan margin with respect to the actuator torque's upper limit is set in accordance with the error prediction value of the model orbit. In FIG. 13, the horizontal axis represents the size of the orbit prediction error value and the vertical axis represents the ratio of the actuator torque upper limit value. Here, the ratio of the upper limit value means the proportion of a constraint value taken into account in the operation plan calculation unit 231 (on the ground side, the operation plan calculation estimation unit 131) to a constraint value taken into account in the operation control unit 24 (on the ground side, the operation control estimation unit 14). A vertical axis value of 100% corresponds to a case where a constraint value taken into account in the operation plan calculation unit 231 (on the ground side, the operation plan calculation estimation unit 131) is the same as a constraint value taken into account in the operation control unit 24 (on the ground side, the operation control estimation unit 14), namely, a case where there is no margin. On the other hand, the lower the vertical axis value, the larger the plan margin.

In FIG. 13, when the orbit prediction error value is 0 km, the plan margin is set as 100−75=25%, and, when the orbit prediction error value is 20 km, the plan margin is set as 100−50=50%. As described above, in the margin setting unit 233 and the margin setting estimation unit 133, the margin setting is conducted in a way that the larger the error prediction value is, the larger the plan margin is given. Then, when the error amount of an operation parameter is predicted to be small, the operation described above can, without setting a useless margin, produce an effective operation plan which brings out the best of the artificial satellite performance; and when the error amount of an operation parameter is predicted to be large, the operation described above sets a sufficient margin to remove an operation uncertainty causing an unattainable operation plan.

In FIG. 13, it is assumed that the upper limit value of the actuator torque changes linearly with the orbit prediction error value; however, the margin setting operation in each of the margin setting unit 233 and the margin setting estimation unit 133 is not limited to an operation utilizing FIG. 13. It suffices that a margin is set in accordance with an error prediction value (on the ground side, an error estimation value) and the same amount of margin is set in the ground-side operation plan estimation unit 13 and the satellite-side operation planning unit 23. In a case where the ground-side operation plan estimation unit 13 and the satellite-side operation planning unit 23 use the same operation parameter information to each produce an operation plan, if a plan margin is a fixed value, it would result in presetting a margin in accordance with the maximum error value to be expected, introducing much uselessness. By setting a variable-margin as described in the present embodiment, it becomes possible to set the minimum margin required at any given time, which leads to an efficient operation bringing out the best of the artificial satellite performance. To be more specific, by setting a margin according to the error prediction value (on the ground side, the error estimation value), it becomes possible to accurately estimate the satellite-side's operation plan on the ground side, without setting an excessively large margin.

Figure 14:
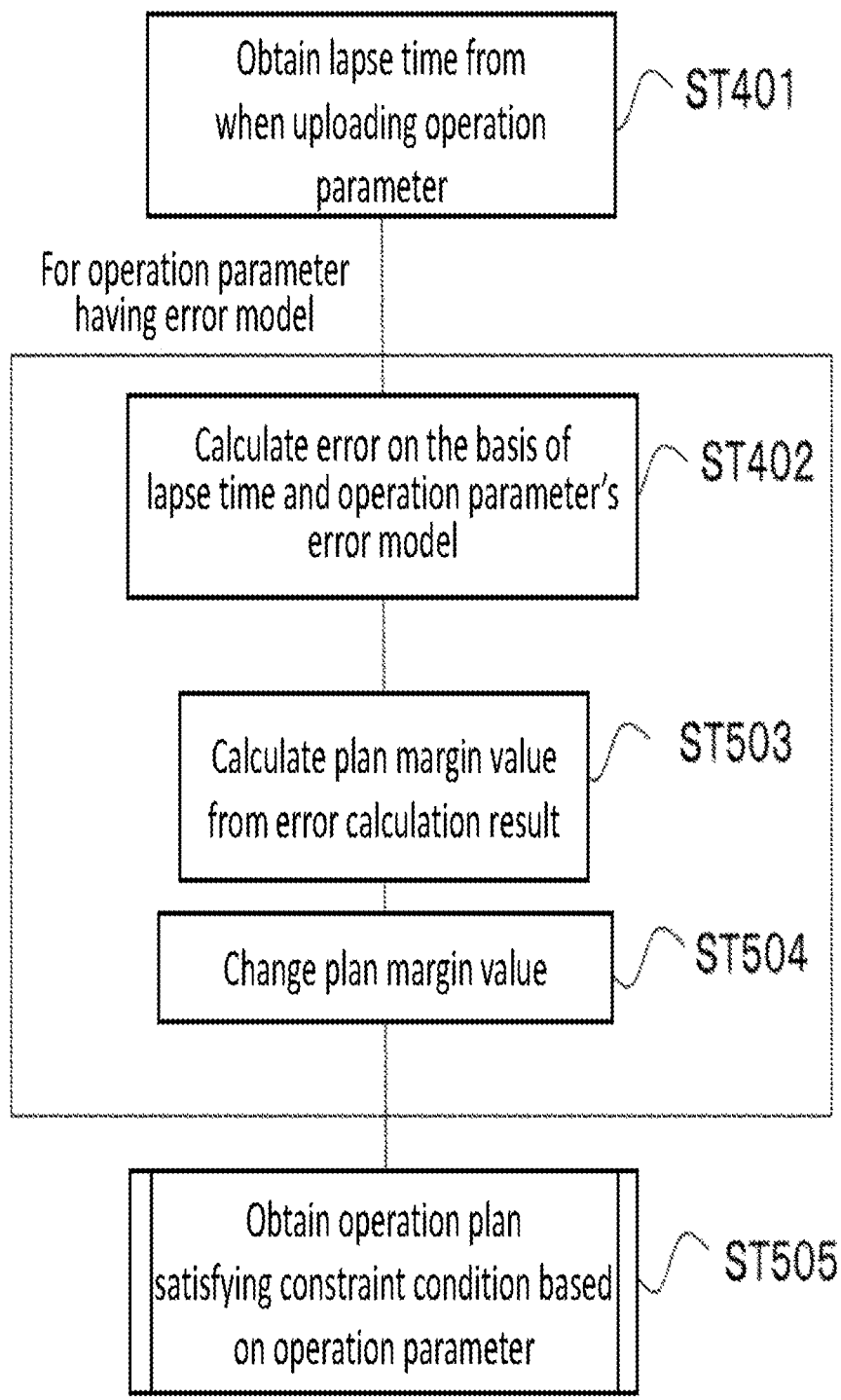
FIG. 14 is a flow chart showing the processing flow of the operation planning unit according to Embodiment 3 of the present invention.

FIG. 14 is a flow chart showing the processing flow of the operation planning unit according to Embodiment 3 of the present invention. FIG. 14 shows an example of the flow of a processing including that of the operation plan calculation unit 231, the parameter error prediction unit 232, and the margin setting unit 233 in the operation planning unit 23 in FIG. 11. Note that, in the following description, components denoted by the same symbols as those in FIG. 10 basically have the same functions.

First, in step ST401, the parameter error prediction unit 232 obtains a lapse time from the time point when the operation parameters are uploaded, as the satellite-side operation parameters, to the satellite-side. Next, the parameter error prediction unit 232 predicts, out of the operation parameters, the errors of operation parameters that have error models as described above; and then, the parameter error prediction unit sets and changes plan margins in accordance with the error prediction values, to produce an operation plan which satisfies constraint conditions based on the operation parameters which include operation parameters changed by the plan margins. Specific processing will be described step by step below.

In step ST402, the parameter error prediction unit 232 obtains error prediction values after the lapse time, using the lapse time obtained at ST401 and error models of operation parameters whose errors are to be estimated.

Next, in step ST503, the margin setting unit 233 calculates plan margin values as described above, using the error calculation results (the error prediction values) obtained in ST402. Furthermore, in step ST504, the margin setting unit 233 sets and changes design margin values of the operation parameters to be used by the operation plan calculation unit 231 for its calculation. In step ST505, the operation plan calculation unit 231 produces an operation plan which satisfies the constraint conditions based on the operation parameters to which the design margins are set.

In FIG. 14, it is described that the operation parameters with error models are processed by steps of ST402 to ST504; however, the operation parameters with error models may be processed at each of the steps.

FIG. 6 is also a diagram showing an example of a hardware configuration of a computer 1000 which realizes a ground-side operation planning apparatus 10 according to the present embodiment, and includes: a processor 1001; a memory 1002; a storage 1003 (substitutable with a memory); an input/output interface 1004; and a communication interface 1005.

The programs describing respective functions of the operation parameter setting unit 11, the operation plan estimation unit 13, the operation control estimation unit 14, and the operation parameter transmission unit 15 are installed in the storage 1003. Also, the programs are loaded, as required, into the memory 1002 and then executed by the processor 1001 to function as the operation parameter setting unit 11, the operation plan estimation unit 13, the operation control estimation unit 14, and the operation parameter transmission unit 15. The storage 1003 functions as the ground-side operation parameter storage 12 to store the ground-side operation parameters.

Also, the computer hardware configuration to realize the satellite-side operation planning apparatus 20 according to the present embodiment may be the same as that in FIG. 6. In this case, the programs describing respective functions of the operation planning unit 23 and the operation control unit 24 are installed in the storage 1003, and are loaded, as required, into the memory 1002 and then executed by the processor 1001 to function as the operation planning unit 23 and the operation control unit 24. The storage 1003 functions as the satellite-side operation parameter storage 22 to store the satellite-side operation parameters.

As described above, the operation planning unit 23 further includes the margin setting unit 233 in addition to the operation plan calculation unit 231 and the parameter error prediction unit 232, to change, in accordance with the error prediction values of the operation parameters, satellite-side plan margins to be used by the operation plan calculation unit 231. On the other hand, the operation plan estimation unit 13 further includes the margin setting estimation unit 133 in addition to the operation plan calculation estimation unit 131 and the parameter error estimation unit 132, to change, in accordance with the error estimation values of the operation parameters, ground-side plan margins to be used by the operation plan calculation estimation unit 131. Note here that the parameter error estimation unit 132 and the parameter error prediction unit 232 use a same solution; the operation plan calculation estimation unit 131 and the operation plan calculation unit 231 use a same solution; and the margin setting estimation unit 133 and the margin setting unit 233 use a same solution. To be more specific, the operation plan estimation unit 13 performs the same processing as the process flow shown in FIG. 14 described above. This makes it possible, both in the satellite side and on the ground side, to set a necessary and sufficient plan margin, thereby producing a more efficient operation plan. In other words, in the autonomous operation planning system, its autonomous operation realizes reduction of the operational load; and also realizes a flexible operation such as changing a plan by adding a necessary command according to a produced operation plan, which leads to an efficient operation of the artificial satellite.

| Description of Symbols | |
|---|---|
| 10: ground-side operation planning apparatus | 20: satellite-side operation planning apparatus |
| 11: operation parameter setting unit | 12: ground-side operation parameter storage |
| 13: operation plan estimation unit | 14: operation control estimation unit |
| 22: satellite-side operation parameter storage | 23: operation planning unit |
| 24: operation control unit | 131: operation plan calculation estimation unit |
| 132: parameter error estimation unit | 133: margin setting estimation unit |
| 231: operation plan calculation unit | 232: parameter error prediction unit |
| 233: margin setting unit | |

The invention claimed is:

1. An autonomous operation planning system for an artificial satellite, comprising:
   at least one ground-side apparatus each comprising:
      a ground-side processor to execute a ground-side program, and
      a ground-side storage to store the ground-side program to be executed by the ground-side processor; and
   at least one satellite-side apparatus each comprising
      a satellite-side processor to execute a satellite-side program, and
      a satellite-side storage to store the satellite-side program to be executed by the satellite-side processor,
   wherein in one of the at least one ground-side apparatus, the ground-side program performs a process of setting at least one operation parameter to be used for operating the artificial satellite,
   wherein in one of the at least one satellite-side apparatus, the satellite-side storage stores the at least one operation parameter,
   wherein in one of the at least one satellite-side apparatus, the satellite-side program performs a process of calculating a satellite-side operation plan for the artificial satellite using at least one satellite-side operation parameter stored in the satellite-side storage,
   wherein in one of the at least one ground-side apparatus, the ground-side storage stores the same operation parameter information as information on the at least one satellite-side operation parameter, and
   wherein in one of the at least one ground-side apparatus, the ground-side program performs a process of estimating the satellite-side operation plan as a ground-side operation plan, using the at least one ground-side operation parameter stored in the ground-side storage.

2. The autonomous operation planning system for the artificial satellite according to claim 1, wherein the ground-side program for the process of setting further performs a process of uploading the at least one operation parameter to the satellite-side storage during a period when the artificial satellite and a ground facility can communicate with each other.

3. The autonomous operation planning system for the artificial satellite according to claim 2,
wherein the satellite-side program for the process of calculating further performs a process of calculating an error prediction value of the at least one satellite-side operation parameter and calculating the satellite-side operation plan using the error prediction value, and
wherein the ground-side program for the process of estimating further performs a process of calculating an error estimation value of the at least one ground-side operation parameter and calculating the ground-side operation plan using the error estimation value.

4. The autonomous operation planning system for the artificial satellite according to claim 3,
wherein the satellite-side program for the process of calculating further performs a process of setting a satellite-side plan margin in accordance with the error prediction value, and calculating the satellite-side operation plan using the satellite-side plan margin, and
wherein the ground-side program for the process of estimating further performs a process of setting a ground-side plan margin in accordance with the error estimation value, and estimating the ground-side operation plan using the ground-side plan margin.

5. The autonomous operation planning system for the artificial satellite according to claim 2,
wherein in one of the at least one satellite-side apparatus, the satellite-side program performs a process of calculating an orbit prediction value using information of a GNSS receiver installed in the artificial satellite, and controlling the operation of the artificial satellite using the orbit prediction value, the at least one satellite-side operation parameter and the satellite-side operation plan.

6. The autonomous operation planning system for artificial satellite according to claim 2,
wherein in one of the at least one satellite-side apparatus, the satellite-side program performs a process of controlling an operation of the artificial satellite, using the at least one satellite-side operation parameter and the satellite-side operation plan, and
wherein in one of the at least one ground-side apparatus, the ground-side program performs a process of estimating, using the at least one ground-side operation parameter and the ground-side operation plan, the operation of the artificial satellite controlled by the process of controlling.

7. The autonomous operation planning system for the artificial satellite according to claim 2,
wherein the at least one operation parameter, the at least one satellite-side operation parameter, and the at least one ground-side operation parameter each include a model orbit parameter for predicting the satellite's future orbit, a parameter indicating the position coordinate of a ground station, a parameter about an orbital position of a data relay satellite, or a parameter indicating a position of an observation target.

8. The autonomous operation planning system for the artificial satellite according to claim 2,
wherein the satellite-side operation plan and the ground-side operation plan each include operation to start and end changing the artificial satellite's attitude or operation to start and end driving a device installed in the artificial satellite.

9. The autonomous operation planning system for the artificial satellite according to claim 2,
wherein in the ground-side program performing the process of estimating, the around-side operation plan satisfying a constraint condition determined by the at least one ground-side operation parameter is calculated, by using the same solution as that used in calculating the satellite-side operation plan.

10. The autonomous operation planning system for the artificial satellite according to claim 1,
wherein the satellite-side program for the process of calculating further performs a process of calculating an error prediction value of the at least one satellite-side operation parameter and calculating the satellite-side operation plan using the error prediction value, and
wherein the ground-side program for the process of estimating further performs a process of calculating an error estimation value of the at least one ground-side operation parameter and calculating the ground-side operation plan using the error estimation value.

11. The autonomous operation planning system for the artificial satellite according to claim 10,
wherein the satellite-side program for the process of calculating further performs a process of setting a satellite-side plan margin in accordance with the error prediction value, and calculating the satellite-side operation plan using the satellite-side plan margin, and
wherein the ground-side program for the process of estimating further performs a process of setting a ground-side plan margin in accordance with the error estimation value, and estimating the ground-side operation plan using the ground-side plan margin.

12. The autonomous operation planning system for the artificial satellite according to claim 1,
wherein in one of the at least one satellite-side apparatus, the satellite-side program performs a process of calculating an orbit prediction value using information of a GLASS receiver installed in the artificial satellite, and controlling the operation of the artificial satellite using the orbit prediction value, the at least one satellite-side operation parameter and the satellite-side operation plan.

13. The autonomous operation a ling system for the artificial satellite according to claim 1,
wherein in one of the at least one satellite-side apparatus, the satellite-side program performs a process of controlling an operation of the artificial satellite, using the at least one satellite-side operation parameter and the satellite-side operation plan, and
wherein in one of the at least one ground-side apparatus, the ground-side program performs a process of estimating, using the at least one ground-side operation parameter and the ground-side operation plan, the operation of the artificial satellite controlled by the process of controlling.

14. The autonomous operation planning system for the artificial satellite according to claim 1,
wherein the at least one operation parameter, the at least one satellite-side operation parameter, and the at least one ground-side operation parameter each include a model orbit parameter for predicting the satellite's future orbit, a parameter indicating the position coordinate of a ground station, a parameter about an orbital position of a data relay satellite, or a parameter indicating a position of an observation target.

15. The autonomous operation planning system for the artificial satellite according to claim 1,
wherein the satellite-side operation plan and the ground-side operation plan each include operation to start and end changing the artificial satellite's attitude or operation to start and end driving a device installed in the artificial satellite.

16. The autonomous operation planning system for the artificial satellite according to claim 1,
wherein in the ground-side program performing the process of estimating, the ground-side operation plan satisfying a constraint condition determined by the at least one ground-side operation parameter is calculated, by using the same solution as that used in calculating the satellite-side operation plan.

17. An operation planning apparatus for an artificial satellite, comprising:
at least one ground-side device each comprising:
a ground-side processor to execute a ground-side program, and
a ground-side storage to store the ground-side program to be executed by the ground-side processor,
wherein in one of the at least one ground-side device, the ground-side program performs a process of setting at least one operation parameter to be used for operating the artificial satellite,
wherein in one of the at least one ground-side device, the ground-side storage stores information on the at least one operation parameter has the same information as that to be stored in a satellite-side operation parameter storage, and
wherein in one of the at least ground-side device, the ground-side program performs a process of estimating a satellite-side operation plan as a ground-side operation plan, using the at least one ground-side operation parameter stored in the ground-side storage.

18. The operation planning apparatus for the artificial satellite according to claim 17,
wherein in one of the at least one ground-side device, the ground-side program performs a process of using the at least one ground-side operation parameter and the estimated ground-side operation plan, to estimate the artificial satellite's operation control to be performed using the at least one operation parameter stored in the satellite-side operation parameter storage and the satellite-side operation plan.

19. The operation planning apparatus for the artificial satellite according to claim 18, further comprising a transmitter to transmit to the artificial satellite, the at least one operation parameter obtained as the at least one satellite-side operation parameter for the artificial satellite in setting at least one operation parameter.

20. The operation planning apparatus for the artificial satellite according to claim 17, further comprising a transmitter to transmit to the artificial satellite, the at least one operation parameter obtained as the at least one satellite-side operation parameter for the artificial satellite in setting at least one operation parameter.

* * * * *